US008245852B2

(12) United States Patent
Sloan et al.

(10) Patent No.: US 8,245,852 B2

(45) Date of Patent: Aug. 21, 2012

(54) MOLDED PUMP

(75) Inventors: JoAnne B. Sloan, Sanford, NC (US); Rajaiah Chinthanippula, Sanford, NC (US); Douglas L. Stout, Sanford, NC (US); Dick Edwards, Cary, NC (US)

(73) Assignee: Pentair Water Pool and Spa, Inc., Sanford, NC (US)

( * ) Notice: Subject to any disclaimer, the term of this patent is extended or adjusted under 35 U.S.C. 154(b) by 0 days.

(21) Appl. No.: 12/862,658

(22) Filed: Aug. 24, 2010

(65) Prior Publication Data

US 2010/0314301 A1 Dec. 16, 2010

Related U.S. Application Data

(62) Division of application No. 10/919,116, filed on Aug. 16, 2004, now Pat. No. 7,780,406.

(60) Provisional application No. 60/537,537, filed on Jan. 20, 2004.

(51) Int. Cl.

*B01D 35/00* (2006.01)
*B01D 29/00* (2006.01)
*B01D 35/28* (2006.01)
*E04H 4/16* (2006.01)
*C02F 1/00* (2006.01)

(52) U.S. Cl. ....... 210/448; 210/94; 210/95; 210/167.12; 210/167.13; 210/416.2; 210/435; 210/450; 210/451; 210/452

(58) Field of Classification Search .................. 210/448, 210/452

See application file for complete search history.

(56) References Cited

U.S. PATENT DOCUMENTS

| | | | | |
|---|---|---|---|---|
| 4,059,519 | A * | 11/1977 | Zieg | 210/167.12 |
| 5,299,842 | A * | 4/1994 | Marks et al. | 285/325 |
| 5,554,277 | A * | 9/1996 | Rief et al. | 210/94 |
| 6,716,348 | B1 * | 4/2004 | Morgan | 210/232 |
| 7,531,092 | B2 | 5/2009 | Hazlehurst | |
| 2007/0180604 | A1 | 8/2007 | Griffin et al. | |
| 2008/0079259 | A1 | 4/2008 | Parcell | |
| 2009/0145498 | A1 | 6/2009 | Bowman et al. | |

* cited by examiner

*Primary Examiner* — Benjamin Kurtz

(74) *Attorney, Agent, or Firm* — Quarles & Brady LLP

(57) ABSTRACT

Embodiments of the invention provide a pre-filter assembly for use with a pump. The assembly includes a housing having an intake channel and an outlet channel. The intake channel includes an intake flange around a first circumference and a ribbed surface to facilitate sealing. The outlet channel includes a bottom portion and an outlet flange around a second circumference. The intake flange and the outlet flange are on opposite sides of the housing. The assembly also includes a basket positioned in the housing. The basket has a bottom side and is positioned above the bottom portion of the outlet channel to form a chamber. The basket is positioned in closer proximity to the intake channel than to the outlet channel. In addition, the assembly includes a securing device with a lid having ridges and a clear top to permit the user to view the contents of the basket. The securing device also includes a locking ring with slots and openings to permit the user to view the contents of the basket.

4 Claims, 5 Drawing Sheets

MOLDED PUMP

RELATED APPLICATIONS

This is a divisional of U.S. application Ser. No. 10/919,116 filed on Aug. 16, 2004, now U.S. Pat. No. 7,780,406 which claims the benefit of U.S. Provisional Application No. 60/537,537 filed on Jan. 20, 2004, the entire contents of which are incorporated herein by reference.

FIELD OF THE INVENTION

The present invention relates to a commercial pool pump and more specifically to a partially injection molded pool pump assembly for use in large commercial pool applications.

BACKGROUND OF THE INVENTION

The commercial swimming pool pump market is defined by size, typically ranging from 5 HP to 25 HP. Previously, manufacturing a commercial swimming pool pump using an injection molding process was not practical due the relatively small market size, the capital investment required, and the technical challenges involved in commercializing an injection molded pump of suitable size. Commercial swimming pool pumps are typically constructed of either cast iron or cast bronze that weigh between 300-500 pounds. One disadvantage of commercial pumps is that they normally require special equipment such as a hoist or lift truck to install or replace the pumps. This is especially important when replacing pumps in an existing installation where access by a lift truck is no longer practical without removing facility doors or walls. Another disadvantage of commercial pumps is that they can be susceptible to corrosion, which can cause vital pump components to fail and ultimately shutting down the pump and the pool. In addition, the corroding components deposit chemical materials into the water where they come into contact with the swimmers. Furthermore, the corroding components can deposit permanent chemical stains on the pool walls.

Another disadvantage of cast pumps is that the cast components are cast to a rough size and finish. Therefore, cast components require additional machining to shape and finish the components. Whereas, injection molded components are molded to the correct size and finish.

Still another disadvantage of cast pumps is the inherent defects that are present in the metal casting process. These defects include pinholes, poor surface finish, and rapid surface oxidation. Typically, cast components are reworked to repair these defects thereby adding cost to the manufacture of such pumps. In addition, detection of pinhole leaks does not typically occur until the pump is in operation thus requiring the pump and pool to shut down during repair.

In order to overcome the above mentioned disadvantages, commercial swimming pools typically utilized multiple small, injection molded, residential pumps, usually limited to 3 HP, to obtain the benefit of using a light weight, corrosive resistant pump. However, the costs associated with installing and maintaining multiple pumps were not cost effective.

In addition, one challenge in manufacturing large injection molded parts is the difficulty in molding an open end of a large cylindrical shaped part with a high degree of roundness. Another challenge is that it is difficult to mold a flat plate type geometric shape such as a pump seal plate to a controlled tolerance of flatness. These, geometric shapes tend to move during operation of the pump due to the stresses on the seal plate and housing cylinder.

BRIEF SUMMARY OF THE INVENTION

Embodiments of the invention provide a pre-filter assembly for use with a pump. The assembly includes a housing having an intake channel and an outlet channel. The intake channel includes an intake flange around a first circumference and a ribbed surface to facilitate sealing. The outlet channel includes a bottom portion and an outlet flange around a second circumference. The intake flange and the outlet flange are on opposite sides of the housing. The assembly also includes a basket positioned in the housing. The basket has a bottom side and is positioned above the bottom portion of the outlet channel to form a chamber. The basket is positioned in closer proximity to the intake channel than to the outlet channel. In addition, the assembly includes a securing device with a lid having ridges and a clear top to permit the user to view the contents of the basket. The securing device also includes a locking ring with slots and openings to permit the user to view the contents of the basket.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

DETAILED DESCRIPTION OF THE INVENTION

Figure 1:
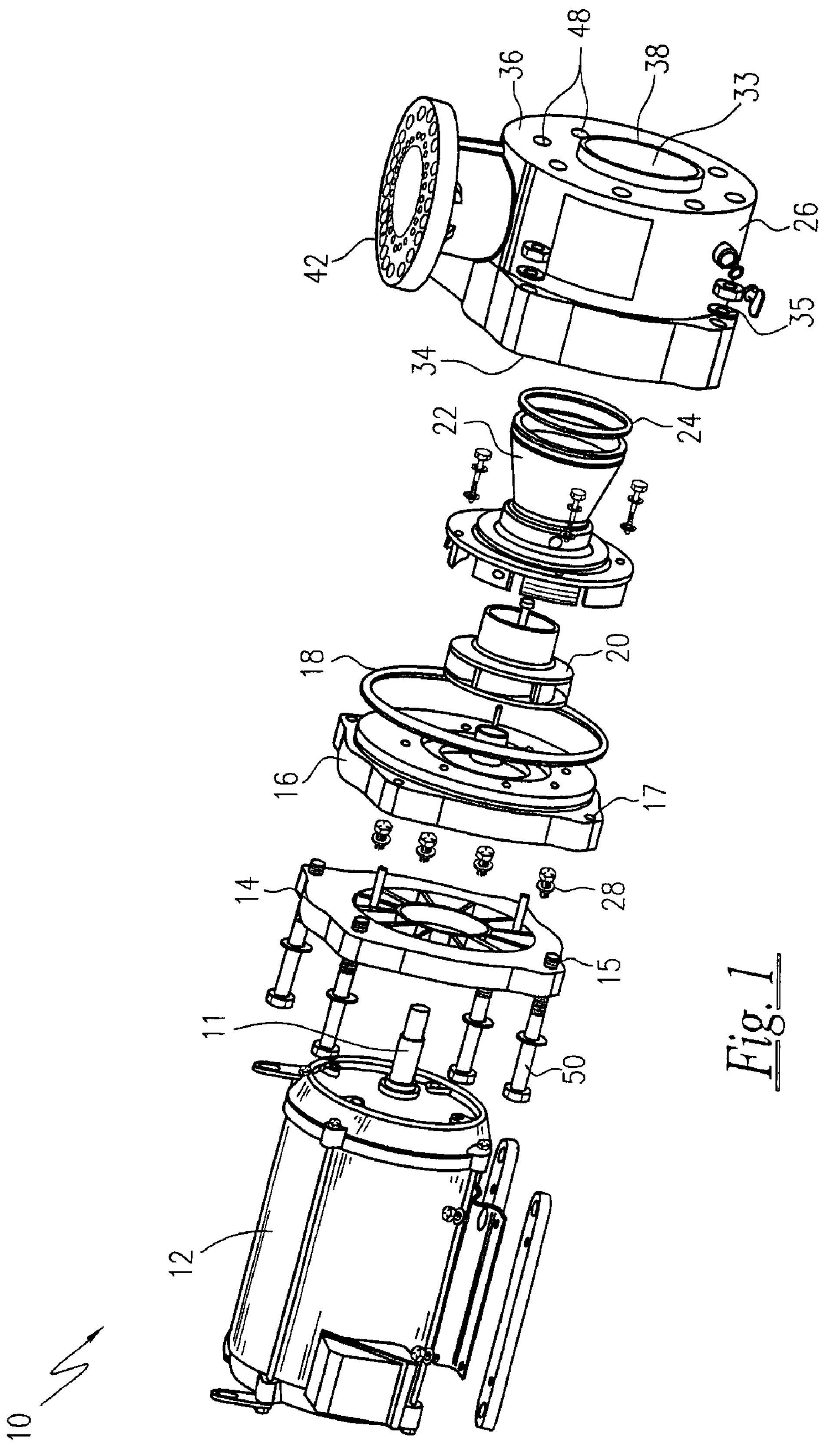
FIG. 1 is an exploded view of a pump assembly according to one embodiment of the invention.
Figure 4:
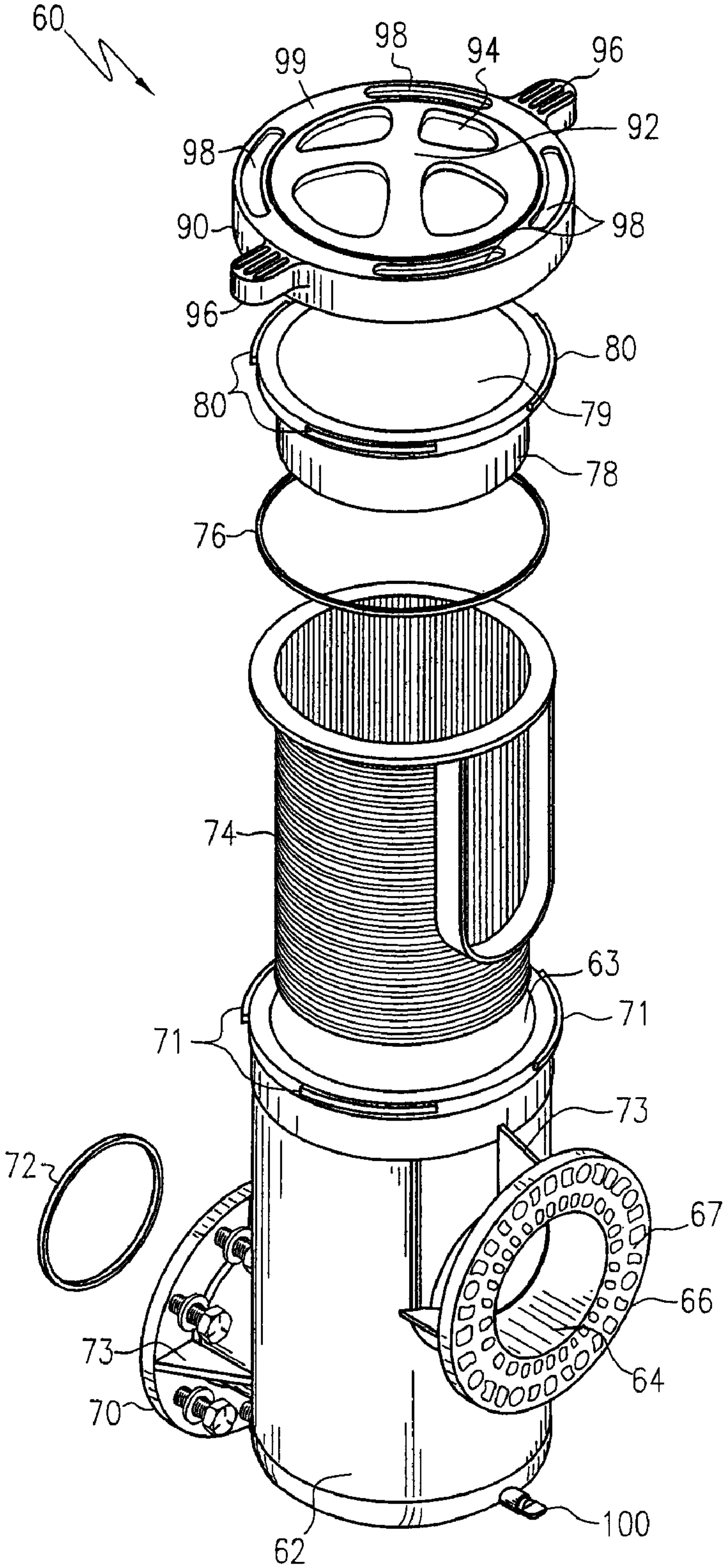
FIG. 4 is an exploded view of a modular pre-pump filter according to one embodiment of the invention.

Referring now to the drawings, FIGS. 1 and 4 show two main assemblies of an injection molded pump. FIG. 1 shows a pump assembly 10 and FIG. 4 shows a modular pre-pump filter assembly 60. The pump assembly 10 will be subsequently described and the modular pre-pump assembly 60 will be described in detail further below.

Figure 2:
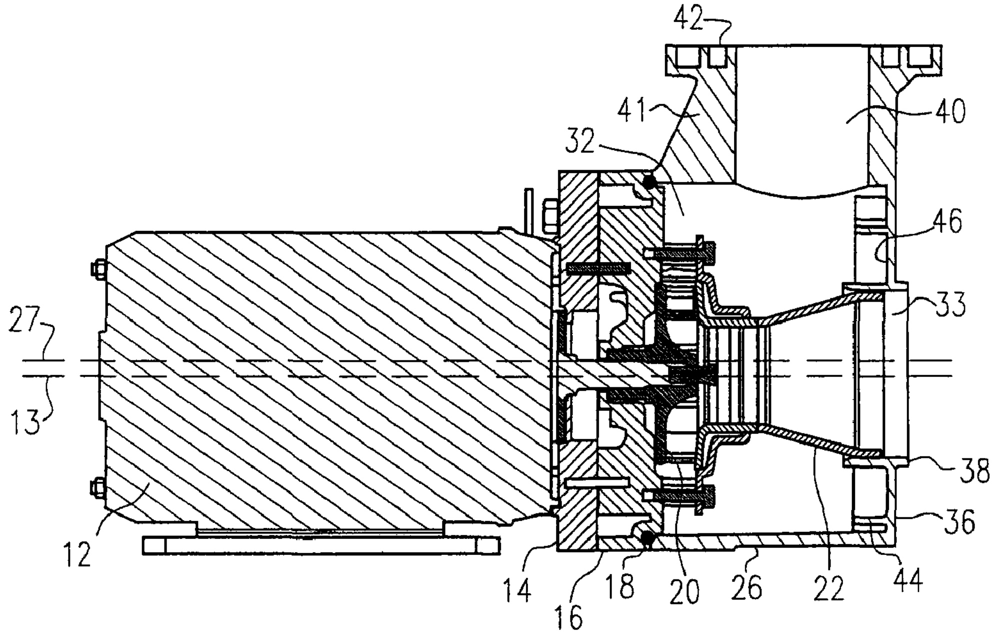
FIG. 2 is across-sectional view of the pump assembly in its assembled state.
Figure 3:
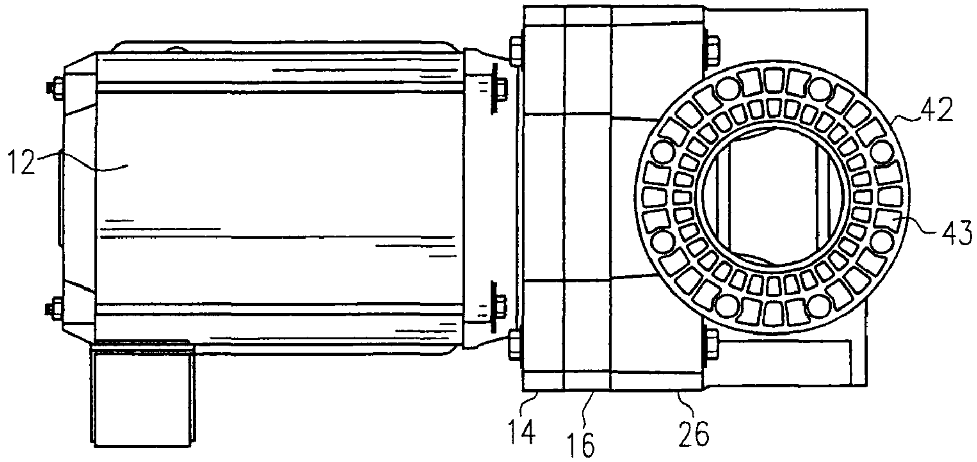
FIG. 3 is a top view of the pump assembly.

Referring to FIGS. 1-3. FIG. 1 shows an exploded view of the pump assembly 10. The main components of the pump assembly 10 include a motor 12 having a rotatable shaft 11, an adaptor plate 14, a seal plate 16, a seal plate o-ring 18, an impeller 20, a diffuser 22 adjacent to the impeller 20, a diffuser o-ring 24, and a pump housing 26. The motor 12 can be, for example, an electric motor having a suitable size and power such as many commonly known in the art and will not be described in further detail. The combination adapter plate 14 and seal plate 16 provide a unique seal arrangement to both increase strength and reduce stress between the pump housing 26 and the motor 12. The adaptor plate 14 attaches to the motor 12 with bolts 28 and transfers pressure created by the pump assembly 10 to the steel frame of the motor 12 thereby reducing deflection in the seal plate 16. The adapter plate 14 includes multiple holes 15 to assemble the pump assembly 10 as will be described below. The seal plate 16 also includes multiple holes 17 that line up with the holes 15 on the adapter plate 14 to connect the adapter plate 14 to the pump housing 26. The seal plate 16 further secures the seal plate o-ring 18 to the pump housing 26. The seal plate o-ring 18 prevents internal fluid of the pump assembly from escaping during operation of the pump assembly 10. Furthermore, as previously mentioned, when injection molding large, flat, plate type components controlling the tolerance of flatness can be a difficult challenge. Therefore, the adapter plate 14 and the seal plate 16 are designed such that they can be manufactured using a simple injection molding process. More specifically, the thickness of the adapter plate 14 and the seal plate 16 are such that they can be manufactured having an acceptable tolerance of flatness.

Still referring to FIGS. 1-3, the pump housing 26 further includes a first opening 32, a second opening 33, a sealing flange 34 with holes 35 to mate with the seal plate 16, an intake flange 36 to mate with the modular pre-pump filter 60, a ridge 38 located on the intake flange 36, an outlet channel 40 and an outlet flange 42. The pump housing 26 has an eccentric geometric design that facilitates the injection molding process, assembly and operation of the pump assembly 10. As shown in FIG. 2, when assembled, the centerline 27 of the pump housing 26 can be located above the centerline 13 of the motor 12 thereby creating a larger volume above the diffuser 22 than below the diffuser 22. This design raises the primer water level such that the pump assembly 10 functions as a self-priming pump when connected to the modular pre-pump filter 60. Furthermore, the eccentric design eliminates the need for complicated injection molding tooling to form an internal chamber normally required for priming a pump. It should be noted that the embodiment shown in FIG. 2 is for illustration purposes only and is not intended to limit the scope of the invention. For example, the centerline 13 of the motor and the centerline 27 of the pump housing 26 can be on the same horizontal plane.

Referring to FIG. 2, the impeller 20 is located in the pump housing 26 and attaches to the motor shaft 11. In addition, the impeller 20 can be located at any position along the centerline 13 of the motor 12. For example, in the embodiment shown the impeller 20 is positioned adjacent to the first opening 32 and not directly beneath the outlet channel 40. This design allows for a high capacity low head performance. Furthermore, the impeller 20 can be made from an injection molding process therefore, giving it a smaller rotating mass than the traditional commercial impellers. This greatly reduces the weight of the impeller 20 and thus reduces the start-up and operating electrical loads of the motor 12.

The intake flange 36 further includes ribs 44 located on the inside face 46 to provide strength to the intake flange 36. Holes 48 are provided on the intake flange 36 to either mate the pump housing 26 to an end user supplied standard flange or to the modular pre-pump filter 60. Metal inserts (not shown) can be provided in the holes 48 for reinforcement. The ridge 38 on the intake flange 36 receives an o-ring 72 (shown in FIG. 4) to seal the pump housing 26 to the modular pre-pump filter 60.

The outlet channel 40 extends in an upward direction and further includes reinforcing ribs 41 to provide support during operation of the pump assembly 10. The outlet channel 40 can be located at any position between the first 32 and second 33 openings. For example, in the embodiment shown the outlet channel 40 is adjacent to the second opening 33. The outlet flange 42 can be an industry standard flange that further includes a unique ribbed surface 43 to provide an optimal seal.

The adapter plate 14, seal plate 16, and the pump housing 26 are connected using multiple bolts 50 as illustrated in FIG. 1. This type of connection and design allows the seal plate 16 to retain a sufficient flatness during operation of the pump assembly 10. Furthermore, under vacuum conditions, the seal plate o-ring 18 is pulled into the gap between the seal plate 18 and the pump housing 26 thereby sealing the joint between them.

Figure 5:
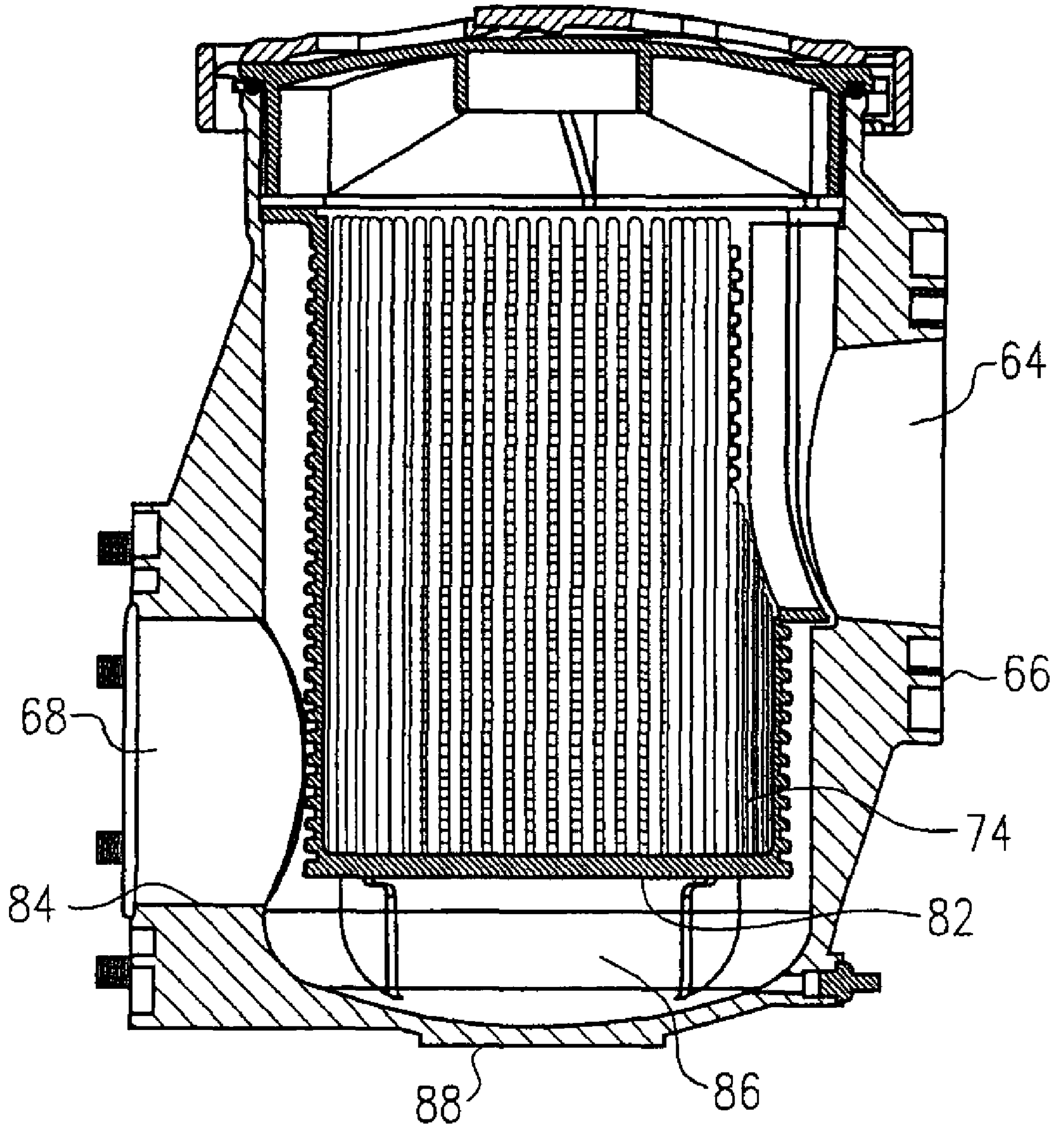
FIG. 5 is a cross-sectional view of the modular pre-pump filter in its assembled state.
Figure 6:
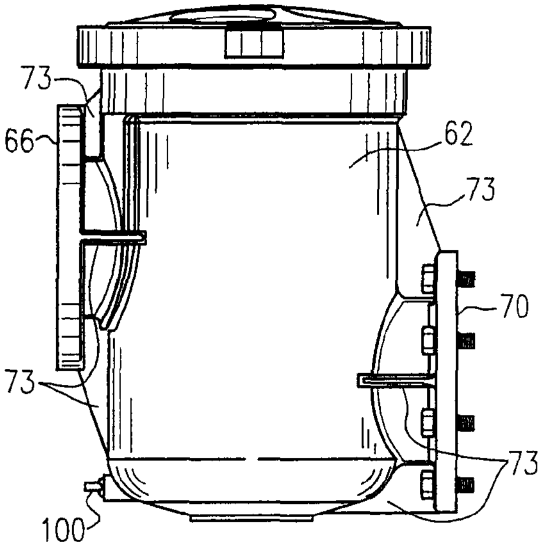
FIG. 6 is a side view of the modular pre-pump filter in its assembled state.
Figure 7:
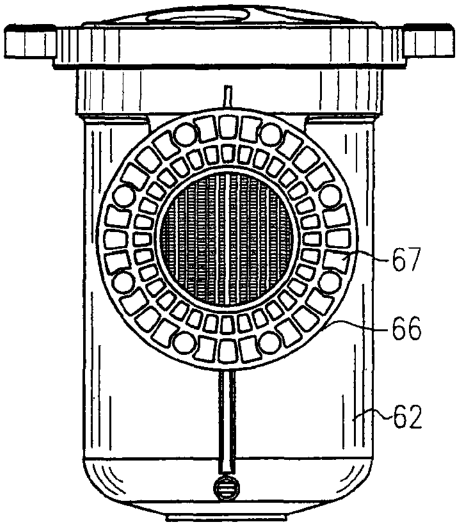
FIG. 7 is a front view of the intake flange.

Referring to FIGS. 4-8, FIG. 4 shows an exploded view of the modular pre-pump filter 60 commonly referred to in the art as a strainer pot. The modular pre-pump filter 60 includes a pre-filter housing 62, a pre-filter basket 74, an o-ring 76, a lid 78, and a locking ring 90. The pre-filter housing 62 can be a fully integrated component and includes a top opening 63, a tapered intake channel 64, an intake flange 66, an outlet channel 68, an outlet flange 70, ridges 71 around the top opening 63, and an outlet o-ring 72. As shown in FIGS. 4 and 6, integrated ribs 67 can be provided at the back of both the intake flange 66 and outlet flange 70 to provide reinforcement and to transfer heavy piping loads that occur at the flange 66, 70 connections. Because both the intake flange 66 and the outlet flange 70 can be industry standard flanges the modular pre-pump filter 60 can either be manufactured as an integral portion of the pump assembly 10 or can be installed as a separate modular unit. As shown in FIGS. 4 and 7, the intake flange 66 includes a unique ribbed surface 67 to provide an optimal seal.

The pre-filter basket 74 can be made of a non-corrosive plastic material. Previous commercial swimming pool pumps utilized a stainless steel or a stainless steel/brass casting construction for the pre-filter basket 74. These baskets had two disadvantages: 1) they were susceptible to corrosion and 2) they were difficult to handle by the user. The pre-filter basket 74 overcomes these disadvantages by providing a lightweight basket with an integrated handle 75 for ease in handling.

Referring to FIG. 5, a unique feature of the modular pre-pump filter 60 is that the pre-filter basket 74 can be positioned in the pre-filter housing 62 at any point between the intake channel 64 and the outlet channel 68. More specifically, the pre-filter basket 74 can be eccentrically positioned within the pre-filter housing 62. For example, in the embodiment shown the pre-pump filter is positioned closer to the intake channel 64 than to the outlet channel 68. This feature allows the pre-filter basket 74 to filter a significant portion of the debris without the pump assembly 10 experiencing any cavitation or loss of head capacity performance.

Another unique feature of the modular pre-pump filter 60 is that the pre-filter basket 74 can be located at any vertical position within the pre-filter housing 62. In other words, the bottom 82 of the pre-filter basket 74 can either rest on the bottom 88 of the pre-filter housing 62 or can be positioned a distance from the bottom 88 of the pre-filter housing 62. For example, in the embodiment shown, the pre-filter basket 74 is positioned above the bottom 84 of the outlet channel 68 to form a chamber 86 in the pre-filter housing 62 below the pre-filter basket 74. This feature allows heavy debris, such as metal objects or stones, to pass through openings (not shown) in the bottom 82 of the pre-filter basket 74 and settle in the chamber 86. The chamber 86 is designed to provide a dead flow zone in the modular pre-pump filter 60 thus preventing any debris that settles in the chamber 86 from passing through the modular pre-pump filter 60 and into the impeller 20.

Figure 8:
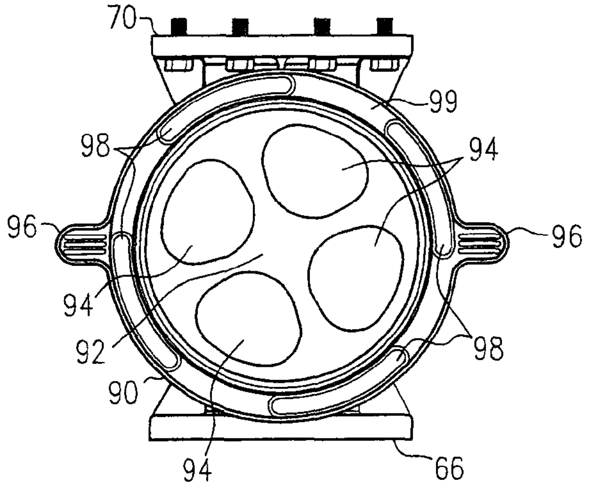
FIG. 8 is a top view of the modular pre-pump filter.

Referring to FIGS. 4 and 8, the lid 78 and locking ring 90 are unique in that previous lids were made of a cast iron construction secured to the pre-filter housing 62 with bolts. Removing the lid for maintenance was typically a time consuming task. The lid 78 and locking ring 90 in the present invention can be made from an injection molded process and are thus light in weight. The lid 78 further includes a clear top 79 that allows the user to view the contents of the pre-filter basket 74. Furthermore, the lid 78 includes multiple ridges 80 equally spaced around the circumference of the lid 78 that are used in conjunction with the ridges 71 on the pre-filter housing 62 and with the locking ring 90 to secure the lid 78 to the pre-filter housing 62 as described below. The locking ring 90 further includes a reinforcing top 92 with multiple viewing openings 94 to allow the user to view the contents of the pre-filter basket 74. The locking ring 90 further includes multiple knobs 96 and multiple slots 98, located on the circumference of the locking ring 90, that assist the user in securing the lid 78 to the pre-filter housing 62. In securing the lid 78 to the pre-filter housing 62, the user places the lid 78 on to the pre-filter housing 62 ensuring that the ridges 71 on the lid 78 line up with the ridges 80 on the pre-filter housing 62. The user then places the locking ring 90 on to the lid 78 so both sets of ridges 71 and 80 extend through the slots 98. The user then grasps the knobs 96 and partially rotates the locking ring 90 so that a portion of the ridge 71 on the pre-filter housing 62 engages the outer top portion 99 of the locking ring 90, thereby securing the lid 78 to the pre-filter housing 62.

Finally, the modular pre-pump filter 60 includes a wing type drain plug 100 located near the bottom of the pre-filter housing 62 that can be installed and removed without the use of any tools.

While specific embodiments of the invention have been described and illustrated, it is to be understood that these embodiments are provided by way of example only and that the invention is not to be construed as being limited thereto but only by proper scope of the following claims.

The invention claimed is:

1. A pre-filter assembly for use with a pump, the pump being maintained by a user, the pre-filter assembly comprising:

a housing having an intake channel and an outlet channel, the intake channel including an intake flange around a first circumference, the intake flange including a ribbed surface to facilitate sealing, the outlet channel including a bottom portion and an outlet flange around a second circumference, the intake flange and the outlet flange being on opposite sides of the housing;

a basket positioned in the housing, the basket having a bottom side positioned above and beside the bottom portion of the outlet channel to form a chamber, the basket being positioned in closer proximity to the intake channel than to the outlet channel; and a securing device to secure the basket in the housing, the securing device including a lid having a first plurality of ridges and a clear top to permit the user to view the contents of the basket, the securing device including a locking ring having a plurality of slots and a plurality of openings to permit the user to view the contents of the basket.

2. The pump of claim 1 wherein the intake channel is tapered.

3. The pump of claim 1 wherein the housing includes a second plurality ridges located around a top opening, wherein the second plurality of ridges contact the first plurality of ridges on the lid; and wherein the first plurality of ridges and the second plurality of ridges extend through the plurality of slots on the locking ring to secure the lid to the housing.

4. The pump of claim 3 and further comprising an o-ring located between the lid and the top opening of the housing to seal the housing.

* * * * *